INVENTOR
HELMUT BENTELER
BY WILHELM LACHENMAYER

United States Patent Office 3,649,730
Patented Mar. 14, 1972

3,649,730
METHOD OF JACKETING TUBULAR STOCK WITH POLYOLEFIN FOAM
Helmut Benteler, Bielefeld, and Wilhelm Lachenmayer, Berlebeck, Germany, assignors to Benteler-Werke AG, Paderborn, Germany
Original application Sept. 20, 1968, Ser. No. 761,221. Divided and this application May 15, 1970, Ser. No. 37,801
Claims priority, application Germany, Sept. 29, 1967, P 16 29 716.8
Int. Cl. B29d 27/00
U.S. Cl. 264—47                      7 Claims

ABSTRACT OF THE DISCLOSURE

A method of jacketing tubular stock. Metallic tubular stock is advanced in a predetermined direction through an extruding die in the extruding head of an extruder. In this extruding die a jacket consisting of a mixture of preplasticated synthetic plastic polyolefin material and an azodicarbonamide blowing agent is extruded onto the outer circumferential surface of the advancing tubular stock and undergoes foaming while still within the confines of the die. As the jacketed stock issues from the die it passes through an annular member having an inner diameter slightly smaller than the outer diameter of the foamed jacket so that the peripheral surface layer of the jacket is deformed into a continuous smooth skin. Subsequently, the resulting jacketed tubular product is cooled.

---

This is a divisional application of Ser. No. No. 761,221 filed Sept. 20, 1968.

BACKGROUND OF THE INVENTION

The present invention relates to the jacketing of tubular stock. More specifically, the invention relates to a method of jacketing metallic tubular stock with a cellular synthetic plastic material.

It is already known to apply to metallic tubular stock a jacket of cellular synthetic plastic material for thermal and acoustic insulating purposes. One known approach is to heat the metallic tubular stock to a temperature of at most 250° C. and to apply onto the thus heated tubular stock a non-heated mixture consisting of a foamable synthetic plastic, blowing agent and plasticizer. This mixture is applied by passing the heated tubular stock from below into a container which is filled with the mixture. As the tubular stock passes through the container in vertical direction the mixture in the container adheres to the outer surface of the tubular stock as a layer having a thickness of approximately 0.5 to 1 mm. The thus coated tubular stock leaves the container at a temperature of approximately 120–130° C. and advances into a heating oven wherein a temperature of between 150 and 160° C. is maintained. In this temperature the coating begins to gel. Thereupon the coated stock passes through an additional heating oven in which its temperature is raised to 180–200° C. which is sufficient to effect foaming of the coating which thereup constitutes a jacket around the metallic tubular stock with a wall thickness of approximately 1.5–4 mm. and a density of 0.2–0.4 g./cm.³.

Because it is generally undesirable to have the foamed jacket be provided at its outer exposed surface with open cells, which are objectionable because dirt and contaminants can settle in them and also for tactile and aesthetic reasons, a coating which preferably consists of the same synthetic plastic material as the foamed jacket but without the addition of a blowing agent, is thereupon applied over the foamed jacket and caused to gel or set by being subjected to heat.

With this known approach it is possible to produce a satisfactory jacketed tubular product. However, to do so it is invariably necessary to apply the original plastic mixture which is subsequently to be foamed to the stock while the same advances in vertical or nearly vertical direction. It is evident that if the tubular stock were to be advancing in a horizontal direction or even in an inclined direction other than nearly vertical, the coating of liquid mixture which adheres to the outer surface of the tubular stock as the same passes through the bath of mixture would tend to flow towards the lowermost side of the tubular stock. As a result the jacket would be of unequal thickness, that is at the lowermost side it would have a significantly greater thickness than elsewhere at the circumference of the tubular stock. This is of course undesirable because of the impairment in the acoustical and/or thermal insulating properties of the finished product.

On the other hand, advancing of the tubular stock in vertical or nearly vertical direction requires the coating apparatus to have a considerable height, which in turn necessitates that the building housing the appaartus be correspondingly tall. For various reasons, including the expense of constructing such tall buildings, this is undesirable. Attempts have been made to avoid the problem by repeatedly changing the direction of the advancing tubular stock in order to keep the height of the apparatus, and accordingly of the building housing the same, as low as possible. This, however, is also objectionable because the repeated change in direction imposed upon the advancing tubular stock subjects the same to unacceptably high stresses.

A further disadvantage of the known approach to the jacketing of tubular stock is the fact that it is necessary to maintain the level of plastic mixture in the container, that is the level of the bath from which the original coating of the advancing metallic tubular stock is derived, be maintained substantially constant throughout the continuous coating and jacketing operation. Furthermore, the bath must not be allowed to exceed a predetermined maximum temperature because otherwise the layer of mixture adhering to the outer circumferential surface of the advancing tubular stock will not be evenly thick. These two requirements make it necessary to provide a complicated supply mechanism for additional mixture to replace the loss of mixture from the bath and maintain the level of the bath constant, as well as to provide a cooling apparatus for preventing the temperature of the bath from exceeding the predetermined maximum temperature permissible.

Also, and as indicated by the initial description of this prior-art method and apparatus, two consecutive heating ovens are required and must both be maintained at precisely predetermined temperatures.

The necessity to provide an outer smooth non-tubular coating over the outer circumferential surface of the foamed jacket which has been applied to the tubular stock necessarily requires additional equipment, additional raw material and additional labor, so that the cost of the finished product is correspondingly increased.

Finally, the approach of initially heating the tubular stock and applying the plastic mixture in non-heated state to the tubular stock also brings with it certain disadvantages. It is clear that, after the mixture has been initially gelled and subsequently foamed, whereupon it is passed through the cooling zone in conventional manner, the foamed plastic material of the thus obtained jacket will become set under the influence of the reduced temperatures in the cooling zone whereas the jacketed metallic tubular stock will remain at elevated temperature for a period of time after such setting has occurred, because of the thermal insulating properties of the jacket. Thus, when the metallic tubular stock finally does cool, with the result that its outer diameter decreases, the inner diameter of the jacket will remain substantially constant because the material of the jacket is already set. Therefore, the jacket adheres rather loosely to the metallic tubular stock, a disadvantage which is particularly felt in the later handling and installation of thus jacketed stock.

It is accordingly an object of the present invention to overcome these disadvantages.

A more particular object of the present invention is to provide a method which is not subject to these disadvantages outlined above.

In accordance with a concomitant object of the present invention, the method is to provide for simpler and less expensive jacketing of metallic tubular stock with a jacket of cellular synthetic plastic material.

SUMMARY OF THE INVENTION

Pursuant to the above objects, and others which will become apparent hereafter, one feature of our invention resides in the provision of a method of jacketing metallic tubular stock with a cellular synthetic plastic material. In accordance with our method, metallic tubular stock is advanced in a predetermined direction through an extrusion zone, and in this zone there is extruded onto the outer circumferential surface of the advancing tubular stock a circumferentially complete jacket of cellular synthetic plastic. The thus applied jacket adheres to and advances with the tubular stock. Once the jacket has been applied to the tubular stock in this manner, the peripheral surface layer of the advancing applied jacket is formed into a continuous smooth skin which is free from open cells and porous, and thereupon the jacketed tubular product thus obtained is subjected to requisite cooling.

By resorting to our invention, and particularly by utilizing an extruder die installed in a crosshead for carrying out our novel method, that is an arrangement wherein the jacketing material is supplied at an angle to the direction of advancement of the tubular stock to be coated, the jacketing material can be applied to the tubular stock while the same advances in horizontal or in substantially horizontal direction. This eliminates the need for advancing the tubular stock in vertical or nearly vertical direction so that an apparatus for carrying out our novel method may be rather low.

By utilizing a die mounted in a crosshead the tubular stock is completely surrounded with a layer of jacketing material whose wall thickness is substantially identical at all circumferential locations. The synthetic plastic jacketing material is pre-plasticated and undergoes foaming even as it is extruded onto the outer circumferential surface of the metallic tubular stock. This means that as the jacketed stock issues from the die, the foaming of the jacketing material has progressed so far already that any further changes in the wall thickness of the foamed jacket are of a minor nature. The possibility of variations in the thickness of the jacket resulting from horizontal advancement of the metallic tubular stock is precluded because the wall thickness of the jacket is determined and maintained constant by the extruder die while a given jacket increment is still located within the confines of the die, whereas changes of a significant nature in increments of the jacket which issue from the die are impossible for the reasons outlined above.

The advantages of our invention will be evident. They include the fact that horizontal advancement of the tubular stock makes it possible to give the apparatus a low profile so that the same can be used in existing buildings and does not require the construction of special buildings. Furthermore, the necessity for repeated reversals in the direction of the advancing tubular stock is eliminated. Also, our device can be constructed much more simply than is known from the prior art where the direction of advancement of the tubular stock was in vertical or nearly vertical direction. The use of an extruder die in a crosshead precisely dictates the extrusion of the synthetic plastic jacket onto the tubular stock with uniform and constant wall thickness so that the wall thickness of the jacket is no longer dependent upon and governed by the level of the plastic bath in a container as in the prior-art process and apparatus.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
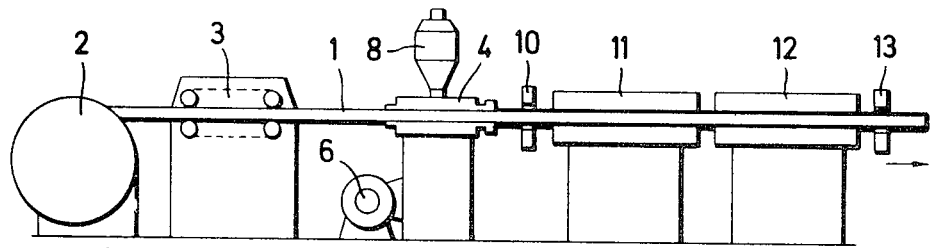
FIG. 1 is a somewhat diagrammatic elevational view of the apparatus according to our invention.
Figure 2:
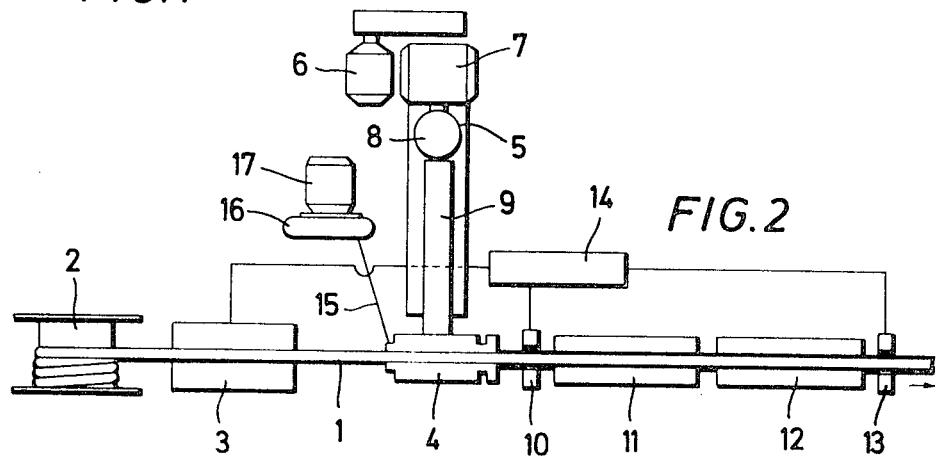
FIG. 2 is a top-plan view of FIG. 1.

Discussing now the drawing in detail, and firstly FIGS. 1 and 2 thereof, it will be seen that we have illustrated somewhat diagrammatically an apparatus for carrying out our novel method. The tubular metallic stock in the illustrated case is assumed to be provided in form of a coil of stock which is supported on a conventional pay-off device 2. The tubular stock itself is identified with reference numeral 1 and is withdrawn from the pay-off device 2 by a conventional haul-off 3, which may be of the caterpillar type as illustrated. Advantageously, and this is as- sumed to be the case in the illustrated embodiment, the haul-off 3 will be constructed so as to simultaneously act as a stock-straightener.

The haul-off 3 advances the stock 1 through the crosshead 4 of an extruder 5 in the direction indicated by the arrows at the right-hand sides of FIGS. 1 and 2. The crosshead 4 will be discussed in more detail below with respect to FIG. 3.

In the crosshead 4 foamable synthetic plastic material is extruded about the exterior of the tubular stock 1 which thus becomes jacketed. The synthetic plastic material is pre-plasticated at a temperature of substantially 210° C. and at a screw pressure of about approximately 120 atmospheres in the extruder 5, the latter being driven by a drive motor 6 via a gear 7 (compare FIG. 2), both of which may be of known construction. Reference numeral 8 designates a supply hopper for the synthetic plastic material and reference numeral 9 designates the heated screw housing through which the synthetic plastic material passes on its way from the hopper 8 to the crosshead 4.

Upon issuing from the downstream end of the crosshead 4, that is from the die orifice thereof, the now jacketed stock passes through a measuring device 10 which continuously senses and measures the outer diameter of the jacket applied over the stock 1. Substantially the jacketed stock advances through two cooling zones 11 and 12 of which in the illustrated embodiment the cooling zone 11 is maintained at a relatively high temperature of approximately 60° C. and the cooling zone 12 at a much lower temperature of approximately 10° C. The cooling medium employed may advantageously be water and the temperature of the cooling medium in the cooling zone 11 may range between substantially 50 and 60° C. whereas the temperature in the cooling zone 12 may range between substantially 10 and 20° C. The use of two cooling zones of which the upstream one is warmer than the downstream one, prevents an abrupt cooling of the jacketed stock which could create difficulties, particularly with respect to the quality of the applied jacket.

After passing through the cooling zones 11 and 12, the jacketed tubular product passes through an additional measuring device 13 which again measures the outer diameter of the applied jacket, in this instance the outer diameter after the jacket has been subjected to cooling in the zones 11 and 12. We prefer to provide a control device 14 which is operatively associated with one or both of the measuring devices 10, 13 as well as with the drive for the haul-off 3 and which in known manner varies the speed of operation of the haul-off 3, and thereby the speed at which the tubular stock 1 is advanced in the direction of the arrows through the crosshead 4, as a function of diameter fluctuations measured by one or both of the measuring devices 10, 13. This makes it possible to produce a finished product having a substantially constant outer diameter, it being evident that if the speed of advancement of the tubular stock 1 through the crosshead 4 is increased the quantity and therefore thickness of synthetic plastic material extruded onto the outer surface of the tubular stock 1 will be smaller per length increment of the stock 1 than at a slower speed, assuming that the output of the extruder and screw 9 remain constant. The result is, of course, that the wall thickness of the jacket applied onto the stock 1 is correspondingly decreased. Conversely the thickness of the jacket and accordingly the outer diameter thereof will be increased if the speed at which the tubular stock 1 is advanced in the direction of the arrows is decreased. It must be clearly understood, of course, that this is possible only within very narrow limits because basically the outer diameter of the extruded jacket is determined by the inner diameter of the die in the crosshead 4. Large fluctuations in the outer diameter of the jacket, such as they are known in the prior art, are thus prevented by the use of the crosshead 4 with its associated die, and the just discussed measure with respect to varying the speed of advancement of the tubular stock 1 serves only to effect very small diameter corrections.

Figure 3:
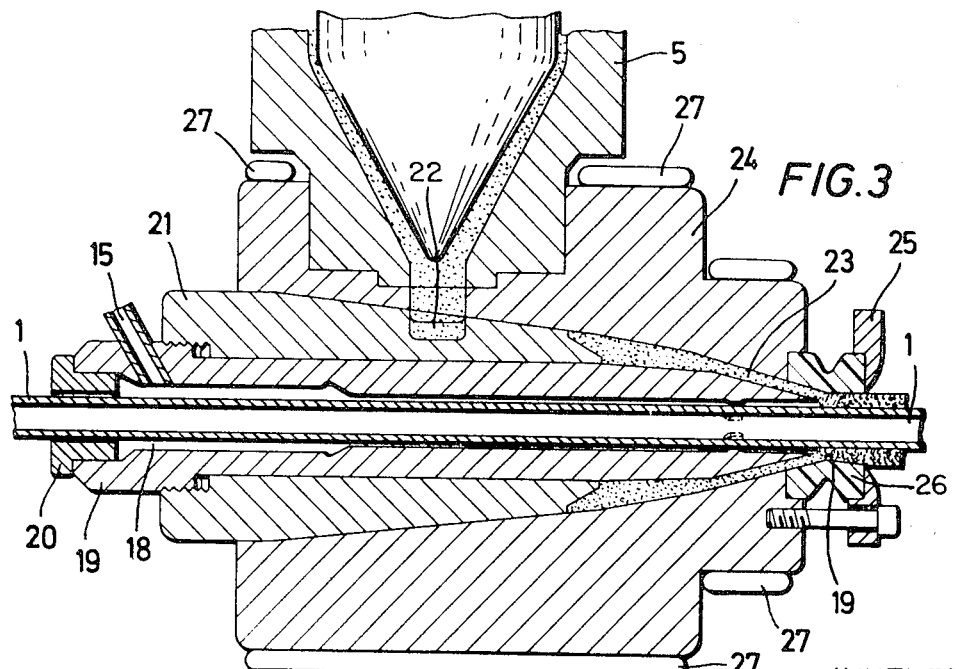
FIG. 3 is a vertical longitudinal section through the crosshead utilized in the apparatus of FIGS. 1 and 2.

Coming now to FIG. 3, a vertical longitudinal section through the crosshead and die of the apparatus shown in FIGS. 1 and 2, it will be seen that the tubular stock 1 is again identified with reference numeral 1, its direction of movement being indicated by the arrow at the right-hand side of FIG. 3. The crosshead is generally identified with reference numeral 4 and includes a member 19 which is provided with a longitudinal bore or passage 18 through which the tubular stock 1 advances. At its upstream end, that is the end facing towards the haul-off 3, the passage 18 is provided with a closure member 20 which circumferentially surrounds the stock 1 and completely closes the passage 18. Details of the closure member 20 are not described because it is conventional.

The member 19 is located in a guide sleeve 21 in which it is axially adjustable via the illustrated mating screw threads, the purpose of this arrangement being to make it possible to continuously vary the quantity of incoming synthetic plastic material, especially when the device is started up. A groove 22, of which only a small portion is visible in FIG. 3, is provided in the guide sleeve 21 and communicates with the annular space 23 defined between the outer circumferential surface of the member 19 and the inner circumferential surface of the bore provided in the housing 24 of the crosshead 4, in which bore the guide sleeve 19 is located. Pre-plasticated synthetic plastic material including a suitable blowing agent, details of which mixture will be discussed subsequently, enters the annular space 23 through the groove 22 from the screw housing 9 of the extruder 5 (compare FIG. 2). It will be seen that the material is supplied laterally in this embodiment so that the apparatus can be made lower than if the material were to be supplied from above or below in which case the height of the apparatus would be increased at least by the length of the screw housing 9. The free effective cross-section of the annular space 23 is variable, especially at that axial end of the space 23 which faces away from the element 20, by axially shifting the member 19 in the manner discussed before.

It will be evident that the synthetic plastic material is extruded onto the outer circumferential surface of the tubular stock 1 at the downstream end 19' of the member 19, that is as the stock 1 emerges from the passage 18 of the member 19. The region of this initial contact of the synthetic plastic material with the stock 1 is surrounded with spacing by a smoothing or forming ring in form of an annular member 26 which is secured in suitable manner, for instance by means of the flange 25, to the apparatus, for example to the housing 24 of the crosshead 4. The annular member 26 advantageously but not necessarily consists of a synthetic plastic material for which purpose we have found polytetrafluorethylene particularly suitable. However, it may suffice if only the inner circumferential surface bounding the opening in the member 26 is coated or lined with such synthetic plastic material and if the remainder of the member 26 consists of a different material, for instance metallic material. It will be noted that in the direction of advancement of the tubular stock 1 the opening in the member 26 converges to a narrowest cross-sectional diameter. In other words, the narrowest cross-sectional diameter of the opening in the member 26 is slightly less than the diameter of the applied jacket of synthetic plastic material just upstream of this narrowest cross-sectional diameter, that is at the point of initial contact between synthetic plastic and tubular stock 1. As a result the outer surface layer of the jacket is formed and smoothed by contact with the inner circumferential surface bounding the opening in the member 26, somewhat in the manner in which garments are ironed. The member 26 is at relatively high temperature which it receives as a result of its direct contact with the housing of the crosshead 4 and with the warm synthetic plastic material. Its action forms a continuous smooth skin on the outer circumference of the applied jacket by closing the originally open cells of the synthetic plastic materials. This eliminates the necessity for supplying a separate cover layer as was heretofore the case. Evidently, the member 26 may be omitted if desired.

Because the jacketed product issues from the member 26 with a smooth outer skin, it may be almost immediately—that is anywhere between approximately 40 and 1000 millimeters downstream of its point of issuance from the member 26—introduced into the cooling device, a possibiliy which makes it possible to reduce the longitudinal dimensions of the apparatus, thereby contributing still further to the compactness of the same.

The tubular stock 1 is supplied to the crosshead 4 in non-heated condition, advantageously at normal room temperature of approximately 20° C. or even cooler, and is jacketed with the pre-plasticated warm synthetic plastic material in the crosshead 4. This results in a particularly good adhesion of the jacketing to the tubular stock 1.

As already indicated earlier the synthetic plastic material supplied to the annular space 23 and extruded onto the tubular stock 1 is a mixture of a foamable synthetic plastic material and a blowing or foaming agent. We have found it advantageous to use a polyolefin as the synthetic plastic material although other materials are suitable for the purpose. We also prefer to use azodicarbonamide as the blowing agent but it should again be understood that other materials are suitable for the purpose. This mixture is pre-plasticated in the extruder by being heated to a temperature of between substantially 180° and 250° C. and being subjected to a screw pressure of requisite value, for example 130 atmospheres. Development of the elevated temperature and of the screw pressure in the extruder is already known in the art. Advantageously we may admix to this mixture, of which the foaming agent may constitute between substantially 0.2 and 1.5 parts by weight, light-weight thermal insulating materials, for example asbestos powder or diatomaceous earth to the extent of substantially 6–15 parts by weight. This addition should take place prior to entry of the mixture into the crosshead and will improve the properties of the finished jacket, particularly the thermal insulating properties thereof.

As the mixture foams on extrusion onto the tubular stock 1, it releases gases. The presence of such gases and/or of air in the region of initial contact between the mixture and the tubular stock 1 may lead to the inclusion of gas or air bubbles between the outer surface of the tubular stock 1 and the inner surface of the synthetic plastic jacket. This is disadvantageous, particularly from the point of view of good and tight adherence of the jacket to the tubular stock 1. We therefore prefer to provide a vacuum pump 16 driven by a motor 17 (see FIG. 2) both of which may be of known construction, and to establish communication between the vacuum 16 and the passage 18 in the member 19 via the conduit 15 (compare FIGS. 2 and 3). In this manner we are able to withdraw gas and/or air from the region of initial contact between synthetic plastic material and tubular stock 1 and to eliminate the aforementioned problems. Because of this withdrawal the vacuum pump 16 may be thought of as withdrawing means for purposes of withdrawing the gas and/or air. Its provision guarantees surface-to-surface contact over substantially the entire area of the outer circumferential surface of the tubular stock 1 with the synthetic plastic material of the jacket. Of course, communication between the pump 16 and the area from which gas and/or air is withdrawn could be established in a manner different from what has been illustrated.

The use of polytetrafluorethylene for the member 26 has already been indicated as advantageous. It might be added that this material is particularly good for the purposes at hand because it is relatively resistant to the stresses which occur in the region where it is being utilized, and because it provides on the jacket a smooth surface having the desired characteristics.

It will also be appreciated that it is possible to eliminate one or the other of the measuring devices 10, 13 shown in FIGS. 1 and 2. However, the provision of both of these measuring devices is particularly advantageous. The use of the device 10 at the location indicated, and of the device 13 also at the location indicated, makes it possible to measure and control the jacket both in still warm and in cool state, a circumstance which permits an immediate determination whether fluctuations in the diameter of the jacket are caused by a lack of homogeneity of the synthetic plastic material or by temperature deviations in the crosshead 4, the extruder 5 or the cooling devices 11, 12. It will also be understood that control of the haul-off speed of the device 3 by the device 14 in dependence upon measurements derived by the devices 10 and 13 may be automatic in known manner whereby manual control is eliminated.

The invention has been illustrated and discussed herein with reference to tubular stock of great length which is coiled in a supply roll and withdrawn from the pay-off device 2. This makes possible continuous operation of the apparatus and continuous carrying out of all functions. Of course, downstream of the novel apparatus the jacketed tubular product may again be coiled or it may be severed into sections of requisite length. If it is desired to jacket individual sections which are straight, rather than being coiled as in the exemplary illustrated embodiment, that it is advantageous to connect these individual sections by internal connecting devices, for instance so-called internal connecting cones of known construction, which are inserted into the downstream end of the upstream section and the upstream end of the downstream section and connect the two together. Thereupon the thus connected sections of tubular stock are jacketed in the manner already illustrated and, on leaving the novel apparatus, are separated by removing the internal connecting devices and severing the jacket at the point of temporary juncture between the sections.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of jacketing metallic tubular stock with foam plastic, comprising the steps of advancing metallic tubular stock in a predetermined direction through an extrusion zone; extruding in said zone onto the outer circumferential surface of the advancing stock a mixture of polyolefin and azodicarbonamide as foaming agent therefor at a substantially constant predetermined rate; withdrawing ambient gaseous fluid present in the region of initial contact of said mixture with said stock; foaming said mixture so as to form about said stock a circumferentially complete jacket of foamed polyolefin; contacting the peripheral surface layer of the advancing jacket of foamed polyolefin at elevated temperature with the inner surface of a circumferentially complete annular member of polytetrafluoroethylene having an inner diameter slightly smaller than the outer diameter of said jacket, and thereby forming said peripheral surface layer into a continuous smooth skin; measuring the outer diameter of the jacketed tubular product downstream of said zone; varying the speed at which said stock advances through said zone as a function of fluctuations measured in the outer diameter of the jacketed tubular product; and contacting the jacketed tubular product downstream of said zone in a first cooling stage with a cooling fluid having a temperature between substantially 50 and 60° C., and in a subsequent second cooling stage with a cooling fluid having a temperature between substantially 10 and 20° C.

2. A method as defined in claim 1, said synthetic polyolefin being pre-plasticated and said foaming agent constituting between substantially 0.2 and 1.5 parts by weight of said mixture.

3. A method as defined in claim 2, said mixture being subjected preliminary to extrusion onto the tubular stock to elevated temperature of between substantially 180° C. and 250° C. and to elevated pressure whereby to undergo preplastication.

4. A method as defined in claim 2; and further comprising the step of admixing with said mixture prior to pre-plastication thereof light-weight thermal insulating material constituting between substantially 6 and 15 parts by weight of the mixture.

5. A method as defined in claim 4, said thermal insulating material including asbestos powder.

6. A method as defined in claim 5, said thermal insulating material including diatomite.

7. A method as defined in claim 1, said tubular stock including two discrete sections; further comprising the initial step of inserting an internal connector into the trailing end of the leading section and the leading end of the trailing section to thereby join the same; and the terminal step of removing the internal connector and separating the jacketed tubular product into its discrete sections.

References Cited

UNITED STATES PATENTS

| | | | |
|---|---|---|---|
| 2,885,737 | 5/1959 | Whalen | 264—47 |
| 3,068,532 | 12/1962 | Higgens | 264—47 |

(Other references on following page)

UNITED STATES PATENTS

| | | | |
|---|---|---|---|
| 3,432,582 | 3/1969 | Bender | 264—47 |
| 3,443,984 | 5/1969 | Stewart | 264—47 X |
| 2,372,162 | 3/1945 | Ryan | 18—13 C |
| 2,736,057 | 2/1956 | Davis | 264—338 X |
| 3,158,529 | 11/1964 | Robitschek | 264—Dig 17 |
| 3,413,387 | 11/1968 | Ohsol | 264—53 X |
| 2,820,987 | 1/1958 | Bunch | 264—47 X |
| 3,431,164 | 3/1969 | Gilbert | 264—48 X |
| 2,332,538 | 10/1943 | Smith | 264—174 |

FOREIGN PATENTS

| | | | |
|---|---|---|---|
| 1,079,551 | 9/1967 | Great Britain | 18—13 H |
| 1,364,174 | 1964 | France | 264—47 |

JULIUS FROME, Primary Examiner

P. A. LEIPOLD, Assistant Examiner

U.S. Cl. X.R.

18—5 P, 12 F, 12 TC, 12 TT, Dig 60; 264—40, 48, 54, 102